March 3, 1970

J. L. KELLER 3,498,111

APPARATUS FOR MEASURING VAPOR-LIQUID RATIO

Filed June 28, 1967

INVENTOR.
JAMES L. KELLER
BY
ATTORNEY

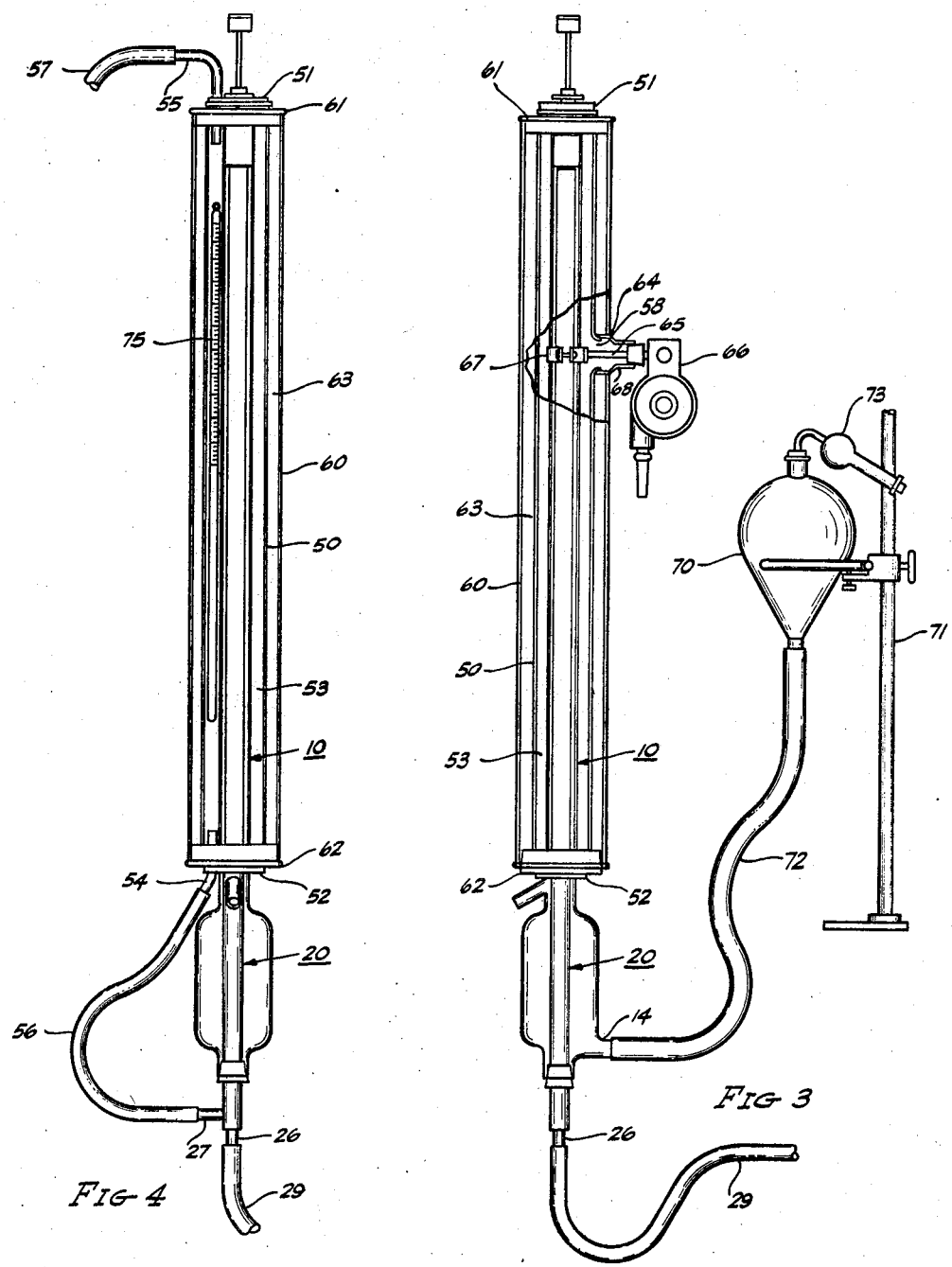

3,498,111
APPARATUS FOR MEASURING VAPOR-LIQUID RATIO
James L. Keller, Fullerton, Calif., assignor to Union Oil Company of California, Los Angeles, Calif., a corporation of California
Filed June 28, 1967, Ser. No. 649,655
Int. Cl. G01n 11/00, 25/02
U.S. Cl. 73—53                                    26 Claims

ABSTRACT OF THE DISCLOSURE

A test apparatus for dynamically measuring the vapor-liquid ratio of a volatile liquid which includes a gas buret provided with an internal heat exchange conduit through which heat exchange fluid can be passed to heat the fluid contents of the buret. The heat exchange conduit is preferably a thin-walled tube constructed of a material having a high thermal conductivity so as to assure that the fluid contents of the buret are maintained substantially in thermal equilibrium with the heat exchange fluid as the temperature of the heat exchange fluid is adjusted over a range of interest. The buret can be provided with external heating fluid and insulating air jackets to reduce heat losses.

---

This invention relates to apparatus for measuring the relationship of temperature and vapor-liquid ratio of a liquid, and more particularly to an improved test apparatus for measuring the temperature corresponding to one or more specific values of vapor-liquid ratio.

The volatility of gasoline and other volatile liquid compositions is often desirably controlled so that the blended product has a preferred volatility characteristic, volatility being defined as the amount of the liquid vaporized at any specific temperature and pressure. In the case of motor gasoline, superior performance is achieved with a gasoline having a volatility selected with consideration for the operating conditions under which it is to be used. Engines fueled with gasoline having too low volatility are difficult to start, whereas gasoline having excessive volatility can cause the engine to be difficult to start when hot and can cause vapor lock at engine operating conditions. Thus, gasoline volatility must be controlled between these limits to attain satisfactory engine performance. Desired volatility is achieved by blending components of different volatilities into the gasoline; it frequently being economically desirable to add a maximum quantity of a relatively low value, high volatility component, such as butane or natural gasoline, so long as the volatility specification for the blended product is not exceeded. Under these conditions, volatility is strongly influenced by the closeness with which the volatility of the final blend approaches the maximum volatility specification.

Gasoline volatility was formerly commonly characterized by Reid vapor pressure. However, because Reid vapor pressure is not directly related to volatility in the range of vapor-liquid ratios pertinent to vapor lock in most cars, many problems are encountered in attempting to use this parameter to control the vapor locking tendency of motor gasolines. For this reason, the concept of vapor-liquid $(V/L)$ ratio was developed to provide a direct measurement of fuel volatility. The vapor-liquid ratio of a gasoline or other multicomponent volatile material, at any specified temperature and pressure, is defined as the ratio of the volume of vapor in equilibrium with liquid, at that temperature and pressure, to the volume of sample, as a liquid, at 32° F.

In application, the numerical value of the maximum allowable vapor-liquid ratio is often set at a value dependent on a number of factors, such as the quality level desired to be maintained for a particular grade of gasoline, the type of equipment in which the gasoline is primarily used, the percentage of market satisfaction desired, etc. Once a numerical value of vapor-liquid ratio is established, gasoline volatilities are controlled by varying the conditions under which the vapor-liquid ratio is determined. Ordinarily the pressure is set at a standard value, such as 760 mm. Hg, and the temperature set at a value approximating underhood temperatures during a particular season and for a specific geographic area. Seasonal and geographic volatility control is then achieved by merely modifying the specified temperature at which the vapor-liquid ratio is measured. In other words, the gasoline product is blended for a specific maximum vapor-liquid ratio, and the temperature at which this vapor-liquid ratio is determined is varied to obtain seasonal and geographic volatility control. The performance of a gasoline of any particular volatility level can be verified by road test of the gasoline under actual road conditions.

Vapor-liquid ratio is conventionally determined by a static method in which the volume of vapor in equilibrium with unevaporated liquid gasoline is measured in a specially constructed gas buret held in a constant temperature bath. This method is set forth as tentative ASTM test method D-2533-66 T and described at pages 953-958 of ASTM standards, part 17, January 1967.

However, there are two major disadvantages of the static or equilibrium method prescribed by the ASTM standard. First, determination of a complete vapor-liquid ratio versus temperature curve requires a series of measurements either in several baths at different temperatures or in one bath in which the temperature is set successively at enough different values to obtain a curve over the temperature range desired. Secondly, the range of commercial gasoline volatilities is so great that all gasolines cannot be characterized by measurement at a single temperature; that is, at a temperature appropriate for highly volatile gasolines, low volatility gasolines would show a vapor-liquid ratio of 0, while at a temperature appropriate for low volatility gasolines, highly volatile gasolines would show a vapor-liquid ratio so high as to be out of the range of concern for vapor lock control. However, all gasolines can be characterized by the temperature at which they exhibit a particular vapor-liquid ratio of interest, and this is a preferred and more meaningful way of expressing the volatility characteristics of the gasoline. Unfortunately, determination of the temperature for a preselected vapor-liquid ratio with the ASTM test method requires a series of measurements from which the desired value is obtained by interpolation. This is tedious and indirect.

A dynamic test method has been proposed to overcome these problems and to provide a convenient means for measuring the temperature at selected values of vapor-liquid ratio. In accordance with this method, a measured quantity of liquid sample is heated in a jacketed gas buret by passing a heat exchange fluid through an external heating fluid jacket. The temperature of the heat exchange fluid is increased to vaporize the liquid sample and the corresponding heat exchange fluid temperature noted at one or more vapor-liquid ratios of interest. While some of the disadvantages of the static method of vapor-liquid ratio measurment are overcome by the dynamic method, this method has not been found entirely satisfactory since thermal lags in heating the sample cause poor accuracy and reproducibility of the measure values.

Accordingly, a primary object of this invention is to provide an improved dynamic test apparatus for measuring equilibrium temperature at selected values of vapor-liquid ratio. Another object is to provide an improved gas buret for heating a liquid sample to determine the vapor-liquid ratio by the dynamic vapor-liquid ratio test method. A further object is to provide apparatus for obtaining more accurate measurements of equilibrium temperature and vapor-liquid ratio. Other objects and advantages of the invention will be apparent from the following description and appendant drawings, of which:

FIGURE 3 is an elevation view, partially in section, showing the general arrangement of the apparatus.

FIGURE 4 is an elevation view of the apparatus from a position removed 90 degrees clockwise from the elevation of FIGURE 3.

Figures 1, 2:
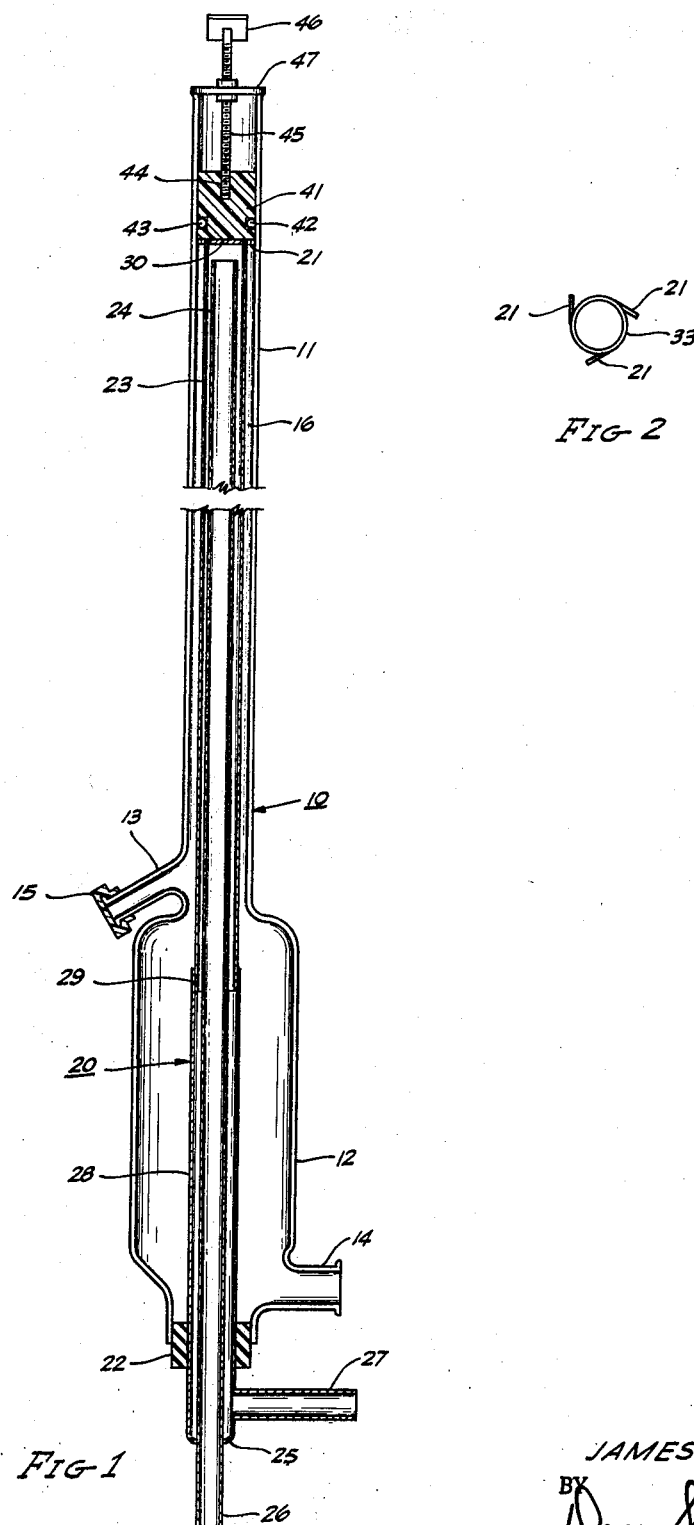
FIGURE 1 is a longitudinal view of the gas buret of this invention, in section.
FIGURE 2 is a detail showing the spacing arms used to maintain the tubular members concentrically positioned.

Briefly, the improved apparatus of the present invention comprises a gas buret having an internal heat exchange conduit through which a heat exchange fluid can be passed to heat the contents of the buret. The heat exchange conduit is constructed so as to permit heat transfer between the heat exchange fluid and the contents of the buret, while preventing these fluids from becoming intermixed. In operation, a measured volume of liquid sample is placed within the buret and confined therein by a body of immiscible liquid having a higher density than the liquid sample. Heat exchange fluid is passed through the internal heat exchange conduit and slowly increased in temperature to at least partially vaporize the liquid sample, the volume of vapor formed thereby being measured by the displacement of the confining liquids. The heat transfer capacity of the apparatus is sufficiently high that the lag between the temperature of the sample and that of the heating media is effectively minimized, thus maintaining the fluid sample substantially in thermal equilibrium with the heat exchange fluid as its temperature is increased over a range of interest. Further, the buret can be provided with external heating fluid and insulating air jackets to reduce thermal losses and to provide more uniform temperatures within the apparatus.

One embodiment of the apparatus of this invention comprises a gas buret having an elongated, hollow, transparent, tubular measuring section fitted with an internal heat exchange conduit of smaller diameter mounted within the measuring section of the buret so as to form a confined anular chamber between the buret and the internal heat exchange conduit which is adapted for the measurement of gaseous volumes by the displacement of an immiscible confining liquid. The heat exchange conduit is provided with inlet and outlet connections communicating to the exterior of the buret through which a heat exchange fluid can be passed to heat the fluid contents of the annular chamber. Preferably, the measuring section of the buret has a uniform interior cross-section and the heat exchange conduit has a uniform exterior cross-section so that the annular chamber defined by these members is of uniform cross-section over a substantial portion of its length. The pressure within the annular chamber can be conveniently adjusted to a standard value and maintained at this value throughout the test by means of a vertically positionable leveling bulb exterior to the buret and in fluid comunication therewith through a flexible tubing connected adjacent the bottom of the buret.

It is essential that the heat exchange conduit have sufficient heat transfer capacity to maintain the fluid contents of the annular chamber at substantially the same temperature as the heat exchange fluid as the heating fluid temperature is adjusted over a range of interest. Temperature lags resulting from the thermal resistance of the heat exchange conduit can be minimized by constructing the conduit of a material having a high thermal conductivity and by utilizing a minimum wall thickness of this material. Heat transfer can be further promoted by maintaining the flow of heat exchange fluid turbulent and by agitating the fluid contents of the annular chamber.

A specific embodiment of the improved gas buret of the present invention is illustrated in FIGURE 1, wherein the buret 10 is shown comprised of an upper elongated, cylindrical measuring tube 11 and an integral lower reservoir section 12 of larger diameter. Tube 11 can be graduated to read the volume of vapor contained within the tube above a liquid interface. The buret 10 is provided with sample injection nozzle 13 adjacent the lower end of the measuring section 11 and leveling fluid connection 14 adjacent the bottom of reservoir 12. Sample injection nozzle 13 is fitted with rubber septum 15, such as a serum bottle stopper of the U.S. Army Medical Corps type, through which the liquid sample is injected by means of a hyperdermic syringe. Preferably, the nozzle 13 is inclined at an upward angle to prevent the injected sample from being trapped in the nozzle and so that the syringe can be held in an inverted position during injection to avoid sample loss by dripping from the syringe. The buret 10 can be constructed of any relatively durable transparent substance, such as glass or plastic, and is preferably constructed of thermally resistant borosilicate glass.

Heat exchange conduit 20 is a tubular assembly extending substantially the length of buret 10, and is mounted concentrically therewithin so as to form confined anular chamber 16 between the inner surface of the buret and the outer surface of the tubular member. Heat exchange conduit 20 is maintained in a substantially concentric position in the buret by means of spacer arms 21, which are attached adjacent the upper end of the tubular member and adapted to engage the inner surface of measuring tube 11, and by closure 22 adjacent the bottom end of the buret 10. Closure 22 is a rubber or other elastic body capable of providing a fluid-tight seal at the open lower end of the buret 10, and suitably bored to accommodate the tubular member 20. Additional spacers 21 can be provided along the length of conduit 20, if desired. The spacer arms can be soldered directly to the tubular member after the member has been inserted through closure 22 or, alternatively, as illustrated in FIGURE 2, arms 21 can be attached to a ring 33 which is adapted to slip onto the exterior of heat exchange conduit 20. Preferably, measuring tube 11 has a uniform interior cross-section and heat exchange conduit 20 a uniform exterior cross-section so that annular chamber 16 defined thereby is of substantially uniform cross-section over the length of the measuring section.

Heat exchange conduit 20 can be arranged with a heat exchange fluid inlet at one end and an outlet at its opposite end so that heat exchange fluid passing through the conduit flows the length of the buret. However, a more convenient arrangement of the apparatus having both the inlet and outlet connections at the bottom as illustrated in FIGURE 1. In the illustrated embodiment, heat exchange conduit 20 is comprised of an outer tubular member 23 and in inner tubular member 24 concentrically positioned therewithin. Spacers, not shown, of the type illustrated in FIGURE 2, can be used to maintain tubular member 24 concentrically positioned within tube 23. The upper end of tube 23 is closed by a plug, or flat end plate 30, which can be soldered in place to provide a fluid-tight seal. Inner tube 24 has an open upper end and terminates a short distance below the upper closed end of tube 23.

As hereinbefore mentioned, tubular member 23 is constructed with an extremely thin wall thickness to minimize heat transfer resistance. Since the thin wall member lacks mechanical strength, it is desirable that additional strength be provided in the bottom section of the member. Accordingly, an outer heavier-walled tubular member can be installed around the lower section of tube 23 to provide additional strength. Also, as illustrated in FIGURE 1, strength can be conveniently provided by constructing a lower section 28 of heavier wall tubular material and fluid-tightly joining the tubular members 23 and 28 at 29. Thus, in the illustrated embodiment, heat exchange conduit 20 is comprised of the outer tubular members 23 and 28 and inner member 24. Tubes 28 and 24 are fluid-tightly joined at 25.

The lower end 26 of tube 24 serves as a fluid inlet connection and is adapted to receive a flexible conduit communicating a heat exchange fluid source, not shown. A fluid outlet 27 is provided adjacent the lower end of tube 28. With this embodiment of heat exchange conduit, heat exchange fluid enters at 26 and passes upwardly through the inner tube 24, then downwardly through the annulus between the inner tube 24 and the outer tubes 23 and 28, whereupon the fluid is discharged from the buret through outlet connection 27. The diameters of tubes 23 and 24 are preferably selected so that the annulus between these tubes is of sufficiently small area to maintain the heating fluid in turbulent flow at normal flow rates.

Tubular member 23 can be constructed of any durable material having a sufficiently high thermal conductivity to minimize its resistance to heat transfer. Thus, while the tubes 23 and 24 can be constructed of glass, plastic or metallic materials, it is preferred that these members be constructed of high thermal conductivity metals, and particularly of certain rust-resistant metals and metal alloys, such as copper, brass, aluminum and stainless steel. As hereinabove disclosed, tubular member 23 is constructed of tubing having a wall thickness as thin as practical to minimize the resistance to heat transfer, and preferably is constructed with a wall thickness of less than about 0.010 inch, and most preferably between 0.004–0.010 inch.

The open upper end of the buret 10 is closed by means of plug 41, which can be a solid body of Teflon, or similar material. Plug 41 has a peripheral groove 42 to accommodate seal ring 43, and is drilled and tapped at 44 to receive threaded shaft 45. Handle 46 is attached to the shaft 45. Plug 41 slidably fits into buret 10 and frictionally engages the inner wall of the buret 10 to provide an easily removable closure at the upper end of the buret. Threaded member 47 is optionally provided to afford an adjustable means of limiting the distance the plug 41 is inserted into the buret, which can be adjusted to engage the upper closed end of tube 23 adjacent an appropriate zero reference mark.

Illustrative of one preferred embodiment of the above-described apparatus, the buret 10 is constructed of borosilicate glass and has an overall length of 24 inches. Measuring tube 11 is 19 inches in length and is precision bored to an internal diameter of 5/8 inch. Reservoir section 12 is 5 inches in length with an outside diameter of 2 inches. The outer tubular member 23 of heat exchange conduit 20 is stainless steel tubing having an outside diameter of 7/16 inch and a wall thickness of 0.006 inch, and lower section 28 of the outer tubular member is constructed of stainless steel tubing having an outside diameter of 1/2 inch and a 0.032-inch wall. Inner tubular member 24 is 5/16-inch outside diameter stainless steel tubing having a wall thickness of 0.010 inch.

Measuring tube 11 can be conveniently graduated so that the volume of the annulus is read directly in milliliters, and the appropriate scale scribed directly onto the exterior surface of the tube 11. The "zero" reference mark is set to correspond with the upper closed end of tube 23, and the plug 41 inserted to this point. The scale then reads downwardly to indicate the volume of gas confined above the liquid interface. The apparatus can be graduated so that this volume is read directly. In an apparatus having the aforementioned dimensions, the cross-sectional area of the annulus formed between the inner surface of measuring tube 11 and the outer surface of tubular member 23 is exactly 1.0 square centimeter. Thus, if measuring tube 11 is graduated with a centimeter scale, the volume of the annulus can be read directly in milliliters.

The general arrangement of one preferred embodiment of the apparatus of this invention is illustrated in FIGURES 3 and 4 wherein the buret 10 is shown assembled for operation. According to this embodiment, the apparatus is supported in vertical position by any convenient means, not shown. The measuring section 11 of the buret is encased by cylindrical transparent member 50 over a substantial portion of its length, and particularly over at least the graduated section. Buret 10 is concentrically positioned within the member 50 by rubber or other elastic end closures 51 and 52 at the top and bottom ends of cylinder 50, respectively. Closures 51 and 52 are formed to receive the buret 10 and to fluid-tightly seal the ends of the cylinder 50 around buret 10 to define a confined annular chamber 53 between the buret and the outer cylindrical member 50 which serves as a heating fluid jacket around the exterior of measuring tube 11. Alternatively, the fluid jacket can be formed integrally with the buret in conventional manner. Fluid connections 54 and 55 are provided at opposite ends of cylinder 50 to permit circulation of the heating fluid through the annulus 53. In the illustrated embodiment, the outlet 27 of heat exchange conduit 20 is connected to jacket inlet 54 by tube 56. Accordingly, with this flow arrangement, heat exchange fluid passes serially through heat exchange conduit 20 and the external fluid jacket, thereafter being discharged from the jacket through tube 57 connected to outlet 55. Tube 57 can communicate to a heat exchange fluid reservoir, not shown, so that fluid exiting at 55 is returned to the reservoir; or alternatively, tube 57 can communicate to a disposal source.

Further, in the illustrated apparatus, an optional outer transparent cylinder 60 is mounted substantially concentrically around the buret and jacket assembly. Rubber or other elastic end closures 61 and 62 are provided to support cylinder 60 in spaced relationship from the cylinder 50 so as to form annular air chamber 63 therebetween. Air chamber 63 provides a transparent insulating medium around the jacketed buret assembly. The cylinder 50 is apertured at 58 and the cylinder 60 is apertured at 64 around the jacketed buret assembly. The cylinder 50 is to accommodate shaft 65 of vibrator 66. Shaft 65 terminates in a clamp 67 which is adapted to grip buret 10. Aperture 64 is covered by flexible boot 68 to maintain a liquid-tight seal for the heat exchange fluid in the annulus 53. Vibrator 66 can be any device which imparts reciprocating or vibratory motion to the shaft 65, such as a Martin model BD size 10 Vibrolator, which device is a pneumatic vibrator marketed by Mine and Mill Machinery Company.

Liquid level can be conveniently adjusted in annular chamber 16 of buret 10 by means of an external, vertically positionable leveling bulb 70 supported by stand 71. Leveling bulb 70 is connected to leveling fluid connection 14 of buret 10 by means of flexible tube 72. Any liquid which is immiscible with the liquid sample, which has a higher density than the sample, and which is not vaporized at the test temperatures can be used as leveling fluid. Glycerine is a satisfactory leveling fluid in gasoline applications, although other liquids will also perform satisfactorily with gasoline and may be preferable in other applications. The leveling fluid is maintained dry by passing air entering the bulb through drying tube 73 which contains a desiccant such as calcium chloride. A fluid which is otherwise suitable but does have a significant vapor pressure at the temperatures of interest, for example water, may be usable as a leveling fluid if the measured vapor volumes are corrected for the partial pressure of the leveling fluid at the corresponding temperature. This complicates the determination, however, and is a less preferred method of operation. The level of liquid in annular chamber 16 of the buret 10 is adjusted by raising and lowering the level of bulb 70. Since liquid displaced by the formation of vapor flows back to bulb 70 through tube 72, it is essential that connection 14 and tube 72 are of sufficient size to prevent pressure build-up in the buret which would affect the equilibrium conditions.

Means are provided for measuring the heating fluid temperature exiting the buret 10. Although a resistance bulb thermometer, or other highly sensitive temperature measuring device can be employed, a standard mercury thermometer graduated in 0.2 or 0.5 degree Fahrenheit increments is usually sufficiently accurate. In the illustrated apparatus a standard total immersion mercury thermometer 75 is suspended in heating fluid jacket 53.

In operation, heat exchange fluid flow is established from a heat exchange fluid source, not shown, through the tube 29 to heat exchange conduit 20. Fluid enters at inlet 26, flows upwardly through inner tubular member 24, then downwardly through the annulus between the inner tube 24 and the outer tubes 23 and 28, whereupon the fluid exits the buret through outlet connection 27. Fluid exiting at 27 is passed through tube 56 to the outer fluid jacket, entering the chamber 53 at inlet connection 54 and exiting through outlet connection 55 and tube 57. The heat exchange fluid is preferably caused to flow through the apparatus at a relatively constant rate of flow by any convenient mode, such as pumping, gravity flow, or with a pressurized reservoir. A flow control device can be provided to maintain a constant flow of heat exchange fluid.

The annular chamber 16 of buret 10 is filled with dry glycerine and a measured quantity of liquid sample injected into the buret by means of a syringe inserted through septum 15. The vertical position of the leveling bulb is adjusted with respect to the liquid interface in the buret to establish a desired pressure therein, i.e., a standard reference pressure such as 760 mm. of Hg, for instance.

The temperature of the fluid entering the buret is varied over a range of interest. Preferably, the heat exchange fluid is heated at a uniform rate of 1–2° F. per minute; however, alternatively, the test can be made by starting at an elevated temperature and cooling the fluid. The heat exchange fluid can be heated by an inline heater that heats only the fluid passing through it, or the entire contents of a fluid reservoir can be heated. Further as another alternate, the temperature of the heat exchange fluid can be controlled by blending hot and cold heat exchange fluid in varying proportions. However, with any mode of heating, the test sample will increase in temperature as the temperature of the heating fluid increases, thereby vaporizing the more volatile constituents of the sample. The vapor volume corresponding to selected temperatures can be read directly from the calibrated scale, or temperatures corresponding to preselected vapor volumes can be determined.

On completion of the test, the unit is cooled by circulation of cold heat exchange fluid. The buret is cleared by removing the plug 41 and raising the level of the glycerine by adjustment of the leveling bulb to displace any remaining vapor or liquid.

With the apparatus of the present invention operated in the foregoing manner, vapor-liquid ratios can be obtained by the dynamic test method which are substantially identical to values obtained by the static or equilibrium method. Thus, the advantages of the dynamic method of vapor-liquid ratio measurement can be attained at high accuracy.

Various embodiments and modifications of this invention are apparent from the foregoing description and examples, and further modifications will be apparent to those skilled in the art. Such modifications and changes are included within the scope of this invention.

Having described the invention, I claim:

1. An apparatus for measuring the vapor-liquid ratio of a volatile liquid comprising a gas buret having an elongated measuring section of substantially uniform cross-section circumjacent a heat exchange conduit mounted internally therewithin and which is adapted to conduct a heat exchange fluid longitudinally through said elongated measuring section, said conduit having inlet and outlet connections communicating to the exterior of said buret.

2. The apparatus defined in claim 1 wherein said heat exchange conduit is constructed of a material having a high thermal conductivity.

3. The apparatus defined in claim 1 wherein said heat exchange conduit is constructed of a rust resistant metal.

4. The apparatus defined in claim 3 wherein said heat exchange conduit is a tubular member having a wall thickness of less than about 0.01 inch.

5. The apparatus defined in claim 1 wherein said heat exchange conduit is an elongated tube mounted substantially concentrically within the measuring section of said buret.

6. The apparatus defined in claim 5 including a transparent heating fluid jacket around the exterior of the measuring section of said buret extending substantially the length of said section and having a fluid inlet and a fluid outlet whereby heat exchange fluid is conducted around the exterior of said measuring section.

7. The apparatus defined in claim 6 including means for conducting heat exchange fluid from the outlet connection of said heat exchange conduit to the inlet of said heating fluid jacket.

8. An apparatus for determining the vapor-liquid ratio of a volatile liquid, which comprises:
 a first elongated, hollow, transparent cylinder, at least a substantial length of which has a uniform internal cross-section and an outer transparent fluid jacket;
 means for passing a heat exchange fluid through the jacket of said first cylinder;
 a first elongated, hollow, relatively thin-walled tube constructed of a material having a high thermal conductivity and having a uniform external cross-section of smaller diameter than said first cylinder, said tube being mounted concentrically within said first cylinder so as to form a first confined annular chamber between the inner surface of said first cylinder and the outer surface of said tube, at least a substantial length of said annular chamber being of uniform cross-section;
 means for passing a heat exchange fluid through said tube;
 means for adjusting the level of liquid in said confined annular chamber; and
 sample injection means for introducing a liquid sample into said confined annular chamber.

9. The apparatus defined in claim 8 including an outer transparent member mounted in spaced relationship around at least the jacketed section of said first cylinder so as to provide an outer insulating air space surrounding said jacketed section.

10. The apparatus defined in claim 8 including means to vibrate said first cylinder.

11. The apparatus defined in claim 8 wherein said first tube has a closed upper end and including a second tube of smaller diameter than said first tube mounted substantially concentrically within said first tube, said second tube extending upwardly substantially the length of said first tube and determinating at a point below the upper closed end of said first tube, and wherein said means for passing a fluid through said first tube comprises a fluid inlet connection adjacent the lower terminus of said second tube and fluid outlet connection adjacent the lower terminus of said first tube so that fluid flows upwardly through said second tube and then downwardly through the annulus between said first tube and said second tube.

12. The apparatus defined in claim 8 wherein a lower section of said first cylinder is expanded in cross-section to provide a liquid storage reservoir.

13. The apparatus defined in claim 12 wherein said means to adjust the level in said confined outer space comprises a vertically adjustable leveling bulb connected by flexible tubing to said liquid reservoir.

14. The apparatus defined in claim 8 wherein a scale is scribed on said first transparent cylinder corresponding to the volume of said first confined annular chamber.

15. In combination:
a gas buret comprising an upper elongated, uniformly cylindrical, transparent measuring section and an integral lower liquid reservoir of increased diameter;
a rust-resistant, relatively thin-walled, metal heat exchange tube extending at least substantially the length of said measuring section and having a uniform external cross-section of smaller diameter than said buret mounted concentrically therewithin whereby a confined annular chamber is formed between the inner surface of said buret and the outer surface of said tube, said tube having inlet and outlet connections communicating to the exterior of said buret;
means for agitating a liquid contained in said annular chamber;
a vertically positionable leveling bulb connected to said liquid reservoir by flexible tubing;
means for conducting a heat exchange fluid through said heat exchange tube;
temperature measuring means for measuring the temperature of the heat exchange fluid; and
sample injection means for injecting a sample into said confined annular chamber.

16. The combination defined in claim 15 including a transparent heating fluid jacket around the exterior of the measuring section of said buret extending substantially the length of said section and having a fluid inlet and a fluid outlet whereby heating fluid is conducted around the exterior of said measuring section.

17. The combination defined in claim 16 including an outer transparent member mounted in spaced relationship around at least the jacketed section of said first cylinder so as to provide an outer insulating air space surrounding said jacketed section.

18. The combination of claim 15 wherein said heat exchange tube has a wall thickness of less than about 0.010 inch.

19. The combination of claim 18 wherein a lower section of said heat exchange tube has a thicker wall than the upper section of said tube.

20. The apparatus defined in claim 15 wherein a scale is scribed on the measuring section of said buret corresponding to the volume of said confined annular chamber.

21. The combination defined in claim 15 wherein said first tube has a closed upper end and including a second tube of smaller diameter than said first tube mounted substantially concentrically within said tube, said second tube extending upwardly substantially the length of said first tube and terminating at a point below the upper closed end of said first tube, and wherein the inlet connection of said first tube communicates with said second tube adjacent its lower terminus and the outlet connection of said first tube is located adjacent its lower terminus so that fluid flows upwardly through said second tube and then downwardly through an annulus between said first tube and said second tube.

22. The apparatus defined in claim 8 including means for passing heat exchange fluid successively through said tube and said jacket in series flow.

23. The apparatus defined in claim 16 including means for conducting heat exchange fluid from the outlet connection of said tube to the fluid inlet of said heating fluid jacket.

24. In combination:
a first elongated, hollow, open-ended, glass cylinder having an upper measuring section of uniform internal cross-section, an integral lower liquid reservoir section of larger cross-section, a first lateral connection in the liquid reservoir section, and a second sealable lateral opening for introducing sample into said cylinder;
a tubular heat exhange conduit projecting into said cylinder through the lower open end thereof and extending substantially the length of said first cylinder, said conduit having a uniform external cross-section within the measuring section of said first cylinder of smaller diameter than said cylinder and being mounted concentrically therewithin whereby an annular chamber is formed between the inner surface of said first cylinder and the outer surface of said heat exchange conduit, said heat exchange conduit comprising a first tube of rust-resistant, relatively thin-walled metal having a closed upper end and a second concentrically mounted tube of rust-resistant metal of smaller diameter than said first tube, said second tube extending substantially the length of said first tube and terminating below the upper closed end of said first tube, said second tube having an inlet connection adjacent its lower terminus, and said first tube being fluid-tightly sealed around said second tube at its lower terminus and having an outlet connection adjacent thereto so that fluid introduced into the inlet of said second tube flows upwardly through said second tube and then downwardly through the annulus between said first and second tubes;
a plug longitudinally adjustable within said first cylinder for sealing the upper ends thereof; and
means for sealing the lower end of said first cylinder and supporting said heat exchange conduit therewithin.

25. The combination defined in claim 24 including:
a transparent heating fluid jacket encasing a substantial length of the upper section of said first cylinder, said jacket having fluid inlet and outlet connections;
temperature measuring means for measuring the temperature of the heat exchange fluid in said jacket;
means for vibrating said first cylinder; and
a vertically positionable leveling bulb connected by flexible tubing to said first lateral connection into the liquid reservoir section.

26. The combination defined in claim 24 including an outer transparent cylinder mounted in spaced relationship around at least the jacketed section of said first cylinder so as to provide an outer insulating air space surrounding said jacketed section.

References Cited

UNITED STATES PATENTS

| | | | |
|---|---|---|---|
| 2,119,786 | 6/1938 | Kallam | 73—64.2 X |
| 3,107,205 | 10/1963 | Moran et al. | 23—292 X |
| 3,145,561 | 8/1964 | Thompson | 73—64.2 |
| 3,276,460 | 10/1966 | Feld | 73—53 X |
| 3,336,791 | 8/1967 | Malone | 73—53 X |

LOUIS R. PRINCE, Primary Examiner

J. W. ROSKOS, Assistant Examiner

U.S. Cl. X.R.

23—292; 73—17